(12) United States Patent  (10) Patent No.: US 8,459,882 B2
Kato  (45) Date of Patent: Jun. 11, 2013

(54) SHUTTER FOR A CAMERA (75) Inventor: Shogo Kato, Tokyo (JP)

(73) Assignee: Mamiya Digital Imaging Co., Ltd, Tokyo (JP)

( * ) Notice: Subject to any disclaimer, the term of this patent is extended or adjusted under 35 U.S.C. 154(b) by 0 days.

(21) Appl. No.: 13/326,885

(22) Filed: Dec. 15, 2011

(65) Prior Publication Data

US 2012/0189295 A1  Jul. 26, 2012

(30) Foreign Application Priority Data

Jan. 21, 2011  (JP) .................... 2011-010915

(51) Int. Cl.
*G03B 9/20* (2006.01)
*G03B 9/08* (2006.01)
*G03B 9/58* (2006.01)

(52) U.S. Cl.
USPC ........... 396/497; 396/468; 396/477; 396/478; 396/498

(58) Field of Classification Search
USPC ............... 396/497, 457, 468, 471, 473, 477, 396/478, 498
See application file for complete search history.

(56) References Cited

U.S. PATENT DOCUMENTS

| 3,043,203 | A | * | 7/1962 | Buhrle | 396/214 |
| 3,096,700 | A | | 7/1963 | Willcox et al. | |
| 3,541,942 | A | | 11/1970 | Bertram | |
| 4,527,877 | A | | 7/1985 | Kurosu et al. | |
| 6,253,030 | B1 | | 6/2001 | Miyauchi et al. | |
| 6,347,191 | B1 | | 2/2002 | Kurosu | |
| 2004/0222709 | A1 | | 11/2004 | Naganuma et al. | |
| 2008/0055027 | A1 | | 3/2008 | Kayama et al. | |

FOREIGN PATENT DOCUMENTS

| FR | 1.529.028 | 6/1968 |
| JP | 05-210144 A | 8/1993 |
| JP | 05-265077 A | 10/1993 |
| JP | 11-288019 | 10/1999 |

OTHER PUBLICATIONS

European Patent Office, European Search Report of Application No. EP 11 19 1429, Dated Jan. 27, 2012.
Japanese Office Action dated Nov. 13, 2012 and partial English translation.

* cited by examiner

*Primary Examiner* — Rochelle-Ann J Blackman
(74) *Attorney, Agent, or Firm* — Roberts Mlotkowski Safran & Cole P.C.

(57) ABSTRACT

A camera shutter is provided that includes a first drive member operating an opening blade; a first hook holding the first drive member in a charged position; a closing member operating a closing blade; a second drive member displacing the closing blade to position closing the shutter opening by operating the closing member; a second hook holding the second drive member in a charged position, and a magnet controlling operative timings between the first and second hooks. In operation, the magnet displaces the second hook from a rest position to a charged position and releases the first drive member from the first hook, thereby moving the opening blade. After a predetermined time, the magnet releases the hooking between the second hook and the second driving member such that the closing member is operated by the second driving member, thereby moving the closing blade to the position closing the shutter opening.

8 Claims, 10 Drawing Sheets

SHUTTER FOR A CAMERA

The present application is based on Japanese patent application No. 2011-010915 filed on Jan. 21, 2011, the entire contents of which are incorporated herein by reference.

BACKGROUND OF THE INVENTION

1. Field of the Invention

The present invention relates to a shutter opening and closing mechanism for a camera.

2. Description of the Related Art

Figure 10:
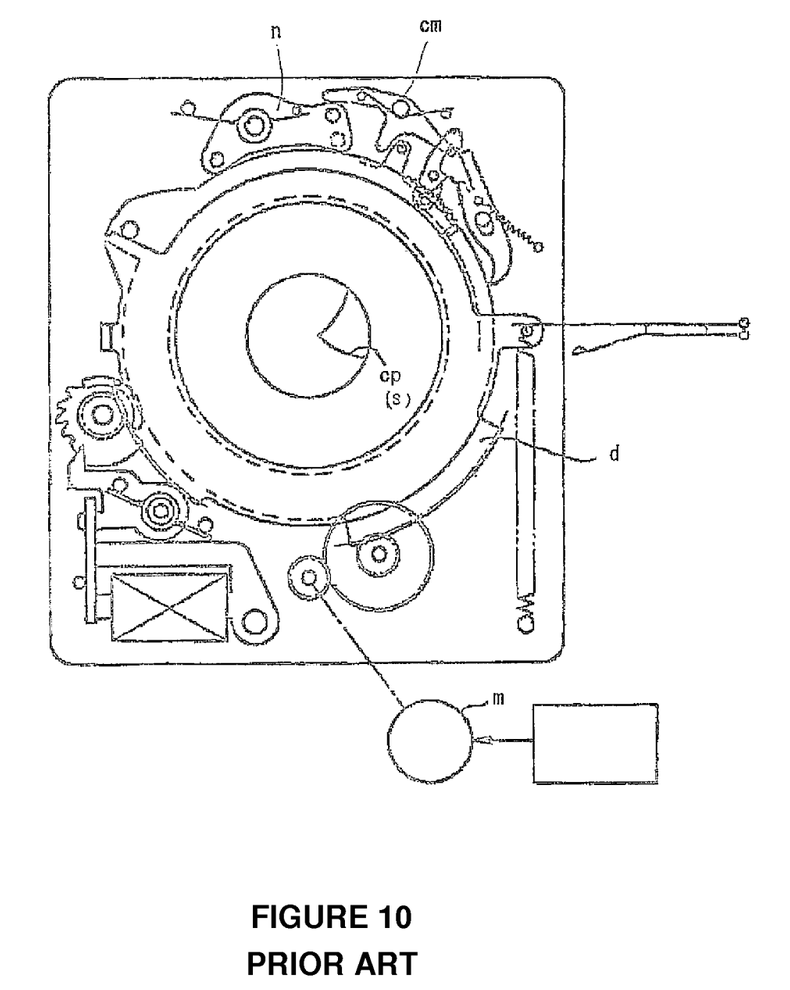
FIG. 10 is an explanation view shown a constitution according to conventional embodiment.

Heretofore, as a shutter opening and closing mechanism for a camera has been known as disclosed, for example, in Japanese Patent Laid Open Publication H5-210144. According to a technical information disclosed in said Japanese Patent Laid Open Publication, it provides a driving member d, operated by a single motor m, an iris member n which makes a closing blade cp settle to a preset value in a position through said driving member d by a normal rotation of said motor m, a closing member cm operating said closing blade cp to a closed position and shutter blades s forced to an opened direction and constitutes as that said driving member d settles a preset value in a position by a reverse rotation of said motor m in an iris setting process, releases said shutter blade s, and releases hooking of said closing member cm by continuous rotation of said motor m and thereby makes said closing blade s close.

PRIOR ART DOCUMENT

[Patent Document 1] Japanese Patent Laid Open Publication H5-210144 (See FIG. 10)

In a conventional technique of the prior Art mentioned above, it controls driving and automatic focus controlling in a motor driving shutter by a single motor and then operates the iris blade through said driving member by a formal rotation of said motor, settles the iris blade to a preset value in a position by a reverse rotation of said motor and further opens the shutter blade. And it releases hooking of said closing member by continuous rotation of said motor and thereby makes said iris blade close.

However, since it controls settling the iris blade to a preset value in a position and opening the shutter blade by formal and reverse rotations of said single motor and further controls the closing operation of the iris blade, it is apt to occur an unstable operations based on clearance among each of parts thereof and engaging situations between each of parts and further cause troubles.

Now, in another embodiment, it can be considerable a way to control starting of the opening operation of the shutter blade by the first magnet and control the closing operation of iris blade by the second magnet. But, it might be feared that constitution thereof would be complex and it is apt to occur an unstable operations and to cause troubles.

BRIEF SUMMARY OF THE INVENTION

It is an object of the present invention to provide the shutter opening and closing mechanism for a camera that it would not occur unstable clearances as mentioned above and can be sure of stable operation.

In order to attain said object, according to the invention described in claim 1, in a camera shutter for settling a closing blade to a preset value in a predetermined position prior to starting of shutter operation, starting an exposure operation by an opening blade, and further terminating an exposure by displacing a closing blade to a closing position, a camera shutter comprising: a first driving member operating said opening blade; a first hook holding said first driving member in a charged position; a closing member operating said closing blade to a position closing a shutter opening; a second driving member displacing said closing blade to position closing a shutter opening by operating said closing member; a second hook holding said second driving member in a charged position; a magnet controlling operative timings between said first and second hooks; being constituting such that by said magnet controlled in connection with a releasing operation of the shutter, displaces said second hook from rest position to charged position and releases said first driving member in connection with operating said first hook, and thereby starts the exposure operation by making said opening blade operate, and such that after a lapse of predetermined time, by said magnet releases the hooking between said second hook and said second driving member and then said closing member is operated by said second driving member so that an exposure operation terminates in connection with displacing said closing blade to the closing position thereof.

And according to the invention described in claim 2, in a camera shutter for settling a closing blade to a preset value in a predetermined position prior to starting of shutter operation, starting an exposure operation by an opening blade, and further terminating an exposure by displacing a closing blade to a closing position, a camera shutter comprising: a first driving member operating said opening blade; a first hook holding said first driving member in a charged position; a closing member operating said closing blade to a position closing a shutter opening; a second driving member displacing said closing blade to position closing a shutter opening by operating said closing member; a second hook holding said second driving member in a charged position; a subsidiary hook being operated almost simultaneously in order said second hook toward a reverse direction thereto; a magnet controlling operative timings between said first and second hooks and further said subsidiary hook; being constituting such that by said magnet controlled in connection with a releasing operation of the shutter, displaces said second hook from rest position to charged position, releases said first driving member in connection with operating said first hook, thereby starts the exposure operation by making said opening blade operate, and further displaced said subsidiary hook to a rest position from a charged position, and thereafter make said second driving member hold to said second hook, and such that after a lapse of predetermined time, by said magnet releases the hooking between said second hook and said second driving member, and then said closing member is operated by said second driving member so that an exposure operation terminates in connection with displacing said closing blade to the closing position thereof.

And further according to the invention described in claim 3, in a camera shutter for settling a closing blade to a preset value in a predetermined position prior to starting of shutter operation, starting an exposure operation by an opening blade, and further terminating an exposure by displacing a closing blade to a closing position, a camera shutter comprising: a first driving member operating said opening blade; a first hook holding said first driving member in a charged position; a closing member operating said closing blade to a position closing a shutter opening; a second driving member displacing said closing blade to position closing a shutter opening by operating said closing member; a second hook holding said second driving member in a charged position; a magnet controlling operative timings between said first and second hooks; an armature lever controlled pull or pull-off positions thereof by said magnet; being constituting such that by said magnet controlled in connection with a releasing operation of the shutter, operates said armature lever and then displaces said second hook from rest position to charged position, and releases said first driving member in connection with operating said first hook, and thereby starts the exposure operation by making said opening blade operate, and such that after a lapse of predetermined time, by said magnet operates said armature lever and releases the hooking between said second hook and said second driving member, and then said closing member is operated by said second driving member so that an exposure operation terminates in connection with displacing said closing blade to the closing position thereof.

And further according to the invention described in claim 4, in a camera shutter for settling a closing blade to a preset value in a predetermined position prior to starting of shutter operation, starting an exposure operation by an opening blade, and further terminating an exposure by displacing a closing blade to a closing position, a camera shutter comprising: a first driving member operating said opening blade; a first hook holding said first driving member in a charged position; a closing member operating said closing blade to a position closing a shutter opening; a second driving member displacing said closing blade to position closing a shutter opening by operating said closing member; a second hook holding said second driving member in a charged position; a subsidiary hook being operated almost simultaneously in order said second hook toward a reverse direction thereto; a magnet controlling operative timings between said first and second hooks and further said subsidiary hook; an armature lever controlled pull or pull-off positions thereof by said magnet; being constituting such that by said magnet controlled in connection with a releasing operation of the shutter, operates said armature lever and then displaces said second hook from rest position to charged position, releases said first driving member in connection with operating said first hook, thereby starts the exposure operation by making said opening blade operate, and further displaced said subsidiary hook to a rest position from a charged position, and thereafter make said second driving member hold to said second hook, and such that after a lapse of predetermined time, by said magnet operates said armature lever, and releases the hooking between said second hook and said second driving member, and then said closing member is operated by said second driving member so that an exposure operation terminates in connection with displacing said closing blade to the closing position thereof.

And as further embodiment to attain the invention, in a camera shutter for settling a closing blade to a preset value in a predetermined position prior to starting of shutter operation, starting an exposure operation by an opening blade, and further terminating an exposure by displacing a closing blade to a closing position, in addition to the constitution mentioned above, it constitutes such that opening blades are formed two pins thereon, one of said pins inserted in slits formed on a restrained member and another of said pins inserted in a hole formed on a driving ring, and then it can supply with a camera shutter constituted such that upon the shutter operation makes another of said pins displace by an operation of a driving ring and further one of said pins displace along a slit formed on a restrained member and thereby opening blades operate.

DETAILED DESCRIPTION OF THE INVENTION

An embodiment of the present invention will be described hereinafter in detail with reference to the drawings. First of all, with reference to a constitution of an embodiment of an opening and closing mechanism for a camera shutter in the present invention will be described in detail with reference to drawings No. 1 to No. 9. Now, an opening and closing mechanism for a camera shutter shown in each of drawings hereinafter shows the embodiment in case applied to a lens shutter.

Figure 1:
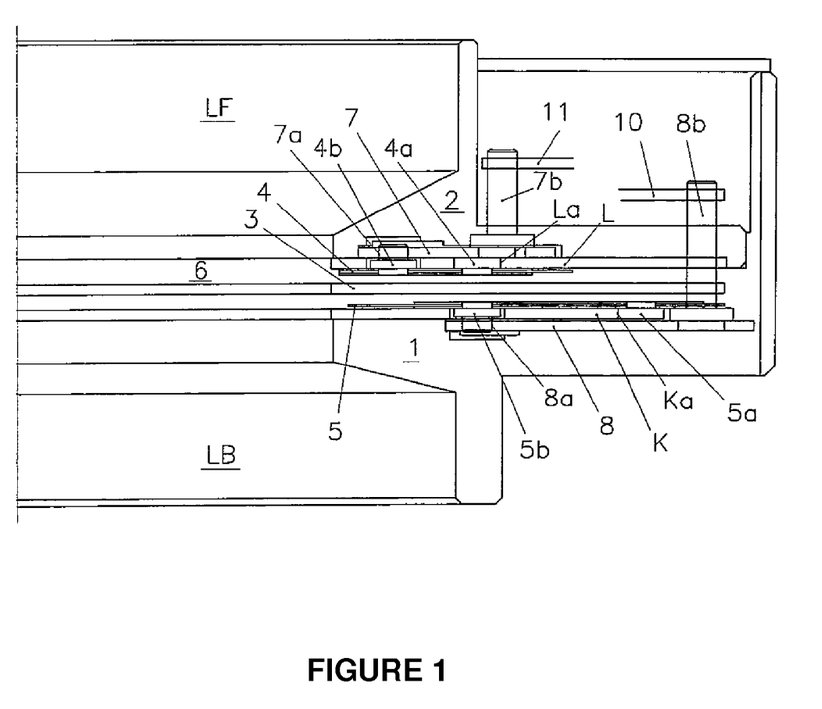
FIG. 1 is a partial sectional view shown a constitution according to an embodiment of the present invention.

As shown in FIG. 1, this opening and closing mechanism for a camera shutter is constituted of an embodiment combined with shutter case 1 attaching a rear lens group LB (not shown) and a base plate 2 attaching a front lens group LF (not shown) And among them, there are a closing blade restraining plate 3 in order to form an operating space of an opening blade and a closing blade, and respectively assembled an opening blade 4 in upper space and closing blade 5 in lower space. an opening blade 4 and a closing blade 5 are respectively constituted of five pieces and these blades are arranged around a shutter opening 6 and control an opening and closing operation of a shutter opening 6.

Figure 2:
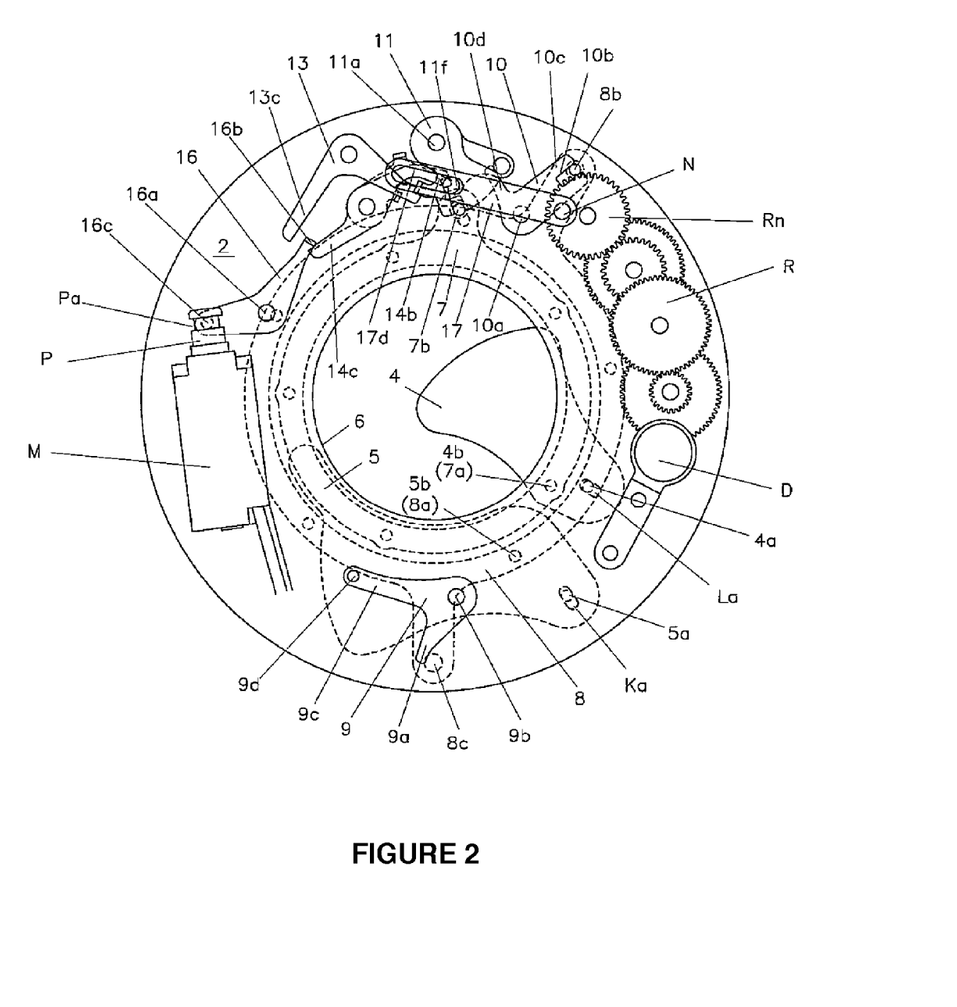
FIG. 2 is a plain view shown whole position in an essential part according to an embodiment of the present invention.

FIG. 2 shows a plain view of an essential part in an opening and closing mechanism arranged on upper side of a base plate 2 on the present invention. On a center of a base plate 2, there is formed a shutter opening 6 to pass light beams through lenses, and by an opening blade 4 and a closing blade 5, an opening and closing operation of this shutter opening 6 is carried out. Now, on FIG. 2, in order to simplify an explain figure, an opening blade 4 and a closing blade 5 are shown respectively only one pieces and remainder blades are omitted respectively in figure therein.

Back to FIG. 1 here, a ring restraining plate L is fixed on a base plate 2 to attach a driving ring 7 to a base plate 2, and also a closing ring restraining plate K is fixed on a shutter case 3 to attach a closing ring 8 to a shutter case 3. A ring restraining plate L prevents interferences between a driving ring 7 and an opening blade 4 when operations thereat, and a closing ring restraining plate K prevents interferences between a closing ring 8 and a closing blade 5 when operations thereat.

There are formed a pin 4a and a driving pin 4b on an opening blade 4 and pin 4a is fitted in a slit La formed on a ring restraining plate L and also a driving pin 4b is fitted in a hole 7a formed on a driving ring 7. Further there is formed a driving pin 7b on a driving ring 7 and attached freely rotatable around a shutter opening 6.

On the other hand, a closing blade 5 provides a function to regulate an aperture opening size, and there are formed pins 5a and driving pins 5b on a closing blade 5. Pins 5a are fitted in slits Ka on a closing ring restraining plate K, and driving pins 5b are fitted in holes 8a formed on a closing ring 8. Further on a closing ring 8 providing a function as a closing member are formed driving pins 8b, 8c and attached freely rotatable around a shutter opening 6 by being forced to a clockwise direction by a spring but not shown. A driving pin 8c contacts with an operating portion 9a of an iris lever 9 and a driving pin 8b fits to a forked portion 10b on a third driving member 10.

Iris lever 9 is constituted such that there is attached freely rotatable around an axis 9a on base plate 2 and pins 9d attached on following portion 9c settles a suitable aperture size by being operated on well-known method. In other word, there are methods such that settles a position of a pin 9d by making well-known cam-member and so on displace with a manual setting or by adopting a mechanism selecting automatically a suitable aperture size according to detect a brightness of a surrounding. By settlement thereof, an operating portion 9a settles a closing ring 8 to a position corresponding to a predetermined aperture size through a driving pin 8c.

A third driving member 10 is attached freely rotatable around an axis 10a on a base plate 2 and constituted of a forked portion 10c formed a slit 10b to insert an operating pin 8b on a closing ring 8, and an operating portion 10d. And now a third driving member 10 is controlled a operating position depending on a slit 10b inserted a driving pin 8b and forced usually toward clockwise direction. This is depending on that corresponding to a position where a pin 9d on an iris lever 9 is displaced, a driving pin 8b on a closing ring 8 is forced around a shutter opening 6 toward a clockwise direction by a spring not shown and displaced thereto.

Secondly, it would explain about a constitution of a driving mechanism in carrying out an opening and closing operation of a shutter. The first driving member 11 is attached freely rotatable around an axis 11a on a base plate 2, formed a slit 11b fitted to a pin 7b on a driving ring 7 and a bent portion 11c, and further forced toward a clockwise direction by a spring not shown. And on the first driving member 11 there are formed a right side surface 11d and a left side surface 11e for contact surfaces, and further a charging pin 11f projecting upward direction thereon.

Further, the second driving member 12 is attached freely rotatable around the same axis 11a with the first driving member 11, forced toward clockwise direction by spring not shown, keeping in a charged position thereof that a pin 12a contacts with a right side surface 11d of the first driving member 11, and formed a bent portion 12b.

A first hook 13 is attached freely rotatable around an axis 13a on a base plate 2, formed a hook potion 13b and an operating portion 13c, and forced toward a counter clockwise direction by a spring not shown. And in a charged position obstructs a rotation of the first driving member 11 toward clockwise direction according to contact a hook portion 13b with a bent portion 11c of the first driving portion 11.

The second hook 14 is attached freely rotatable around an axis 14a on a base plate 2, formed a hook portion 14b and an operating portion 14c, and forced toward a clockwise direction by a spring not shown. And a subsidiary hook 15 is attached freely rotatable around an axis 14a on a base plate 2, and forced toward a clockwise direction by a spring not shown, and a hook portion 15a contacts with a bent portion 12b and thereby keeps the second drive member 12 in a charged position shown in FIG. 2 and FIG. 3. And further, on the subsidiary hook 15 there are formed a bent portion 15b and a bent portion 15c contacted with a left surface 11e of the first driving member 11. Besides, on a charged position before a starting of a operation the second hook 14 is a rest position that hook portion 14b does not contact with a bent portion 12b of second driving member 12, and constituted such displaced toward a hook position in accordance with a starting of an operation by the armature lever 16. In other words, the hook portion 12b of the second driving member 12 is held by a hook portion 15a of a subsidiary hook 15 and therefore it is constituted such that the hook portion 14b of the second hook 14 secures a short clearance among a bent portion 12b.

Armature lever 16 is attached freely rotatable around an axis 16a on a base plate 2, there are formed an operating portion 14c of the second hook 14, a bent portion 16b contacted with an operating portion 13c of the first hook 13 and further a pin 16c fitting to a slit Pa formed on a plunger P including in a magnet M.

Hereupon, the magnet M is connected an electronic control circuit but well known not shown and makes the plunger P pull toward a side of a magnet M depending on applying a current to control an exposure time in the shutter, and further operates such as to pull off. Through such the operation of the plunger P operates a pin 16c fitted to a slit Pa and thereby the armature lever 16 toward a counter clockwise or a clockwise directions in order.

Figure 3:
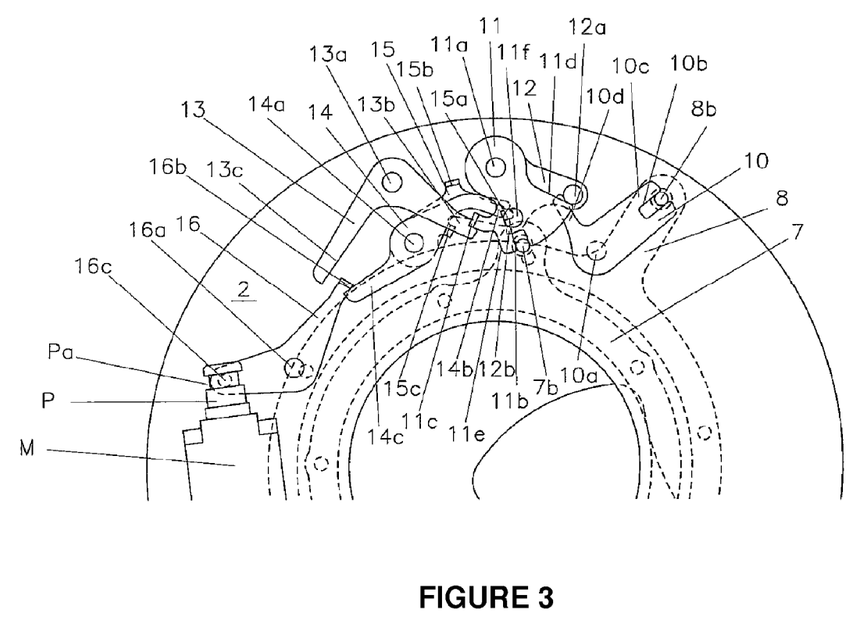
FIG. 3 is an explanation view in charged position enlarged in an essential part according to an embodiment of the present invention.

Next, it is explained about a constitution to charge the shutter mechanism (see FIG. 2 and FIG. 3). A driving motor D attached on a base plate 2 is operated through an electric circuit (not shown) for a shutter charge and then rotations of a driving motor D are decelerated through a gear train R in turn. And a setting member 17 supported with a pin N formed on a gear Rn of a final stage in a gear train R is operated toward reciprocate directions through a rotation of a gear Rn.

Figure 5:
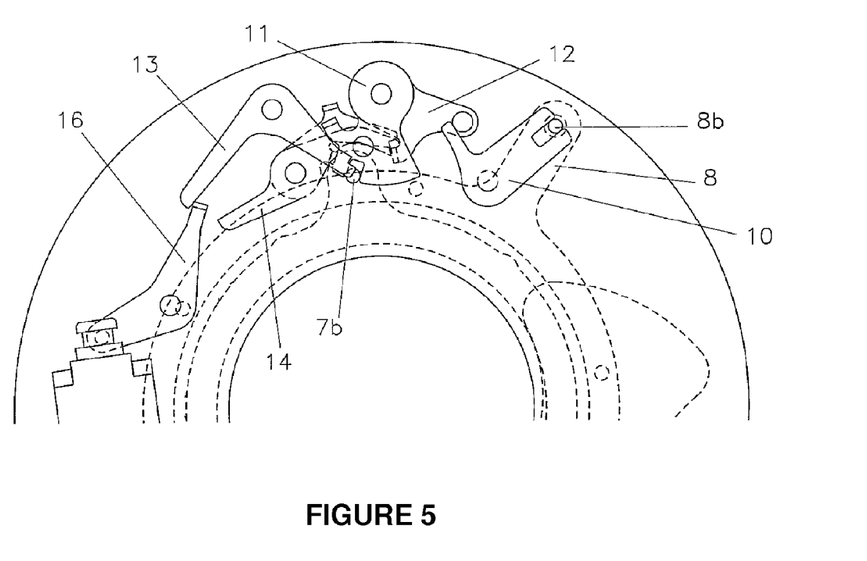
FIG. 5 a plain view shown a fully opened situation of opening blades according to an embodiment of the present invention.
Figure 6:
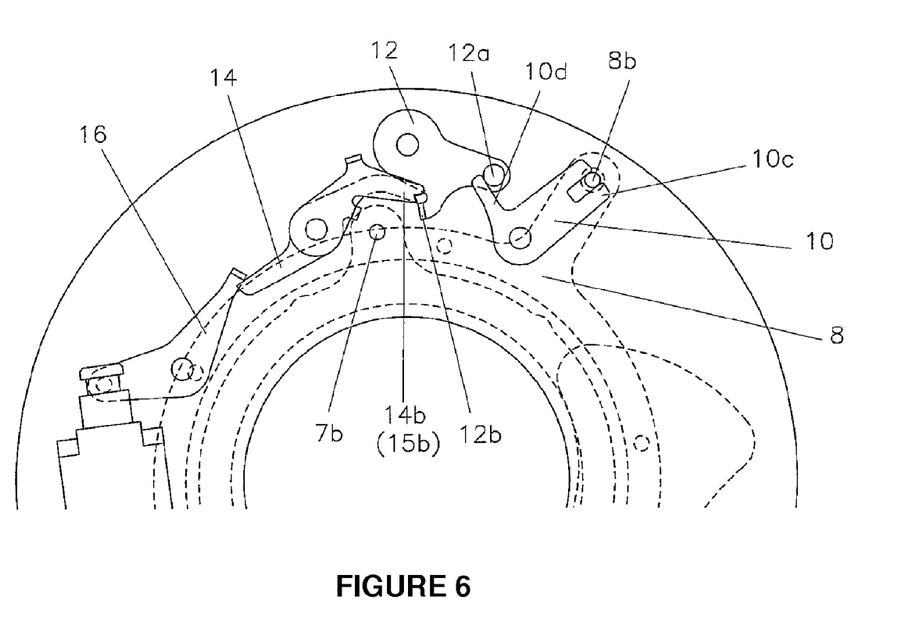
FIG. 6 is a plain view shown immediately after starting of a closing operation of a closing blades a according to an embodiment of the present invention.

As a result, it makes a charging pin 11f fitting a slit 17d formed on a left end of a setting member 17 turn toward a counter clockwise direction around an axis 11a from a final operating position shown in FIG. 5 and displace the first driving member 11 to a charged position shown in FIG. 2. Now, a rotation of a gear Rn of a final stage in a gear train R is decelerated through a gear train R in turn such that the gear Rn rotates approximately one round corresponding with every charging operation on a driving motor D.

Then, in a case of a film camera arranged a silver chloride film on a focusing surface, it must constitute such that a closing blade 5 opens a shutter opening 6 after an opening blade 4 closes it, but in a case of a digital camera arranged a CCD or CMOS sensor on a focusing surface, it would not need such considerations. In brief, it is popular and enough therewith that an operation picking up imaging signals from sensors is carried on an exposure finishing signal described hereinafter.

Further, as a slit 17a formed on a left side of a setting member 17 is prolonged till an end portion thereof, it would be constituted such no obstruction on an operation of the first driving member 11, even if a charging pin 11f would move in a predetermined area for an operation thereof on a shutter operation.

Next, as hereafter, it would be explained about how-to operate an opening and closing mechanism of a shutter for a camera constituted as mentioned hereinabove. On the position shown in FIG. 2, in order to start a shutter operation, an electric current is turned on a magnet M connected to an electronic control circuit well-known and thereby it operates such as to pull a plunger P toward a side of a magnet M depending on a magnetic field occurred in a magnet M. Depending upon the operation thereof, a pin 16c fitting to a slit Pa of a plunger P is operated, an armature lever 16 is turned around an axis 16a toward a counter clockwise direction, an operating portion 14c of a second hook 14 is operated following a bent portion 16b toward a clockwise direction, and therewith a hook portion 14b displaces to a position to hook a bent portion 12b of a second driving member 12.

Figure 4:
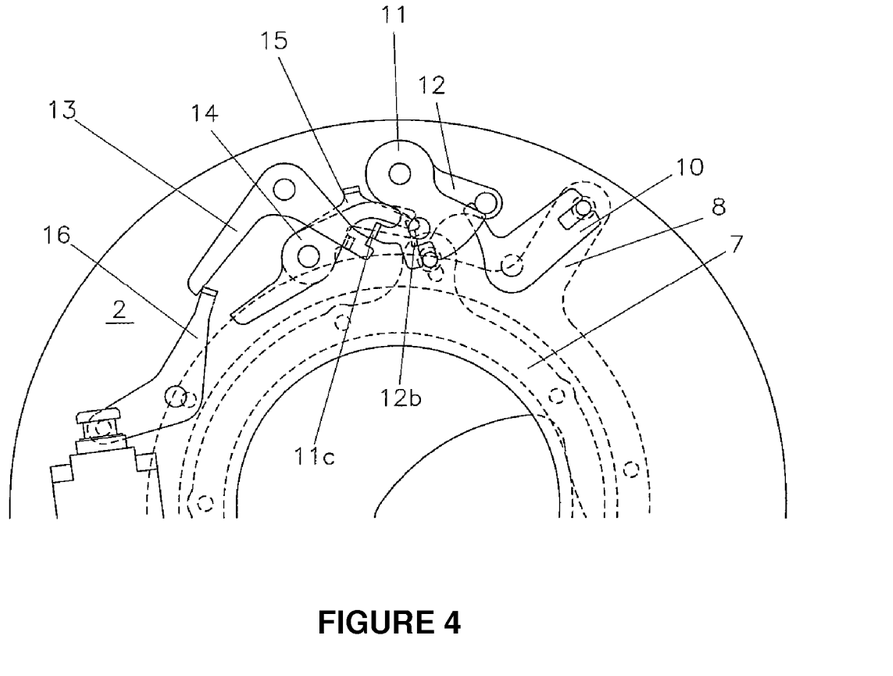
FIG. 4 is a plain view shown immediately after a release operation from a situation of FIG. 3 a according to an embodiment of the present invention.

By a continuous rotation of an armature lever 16 toward a counter clockwise direction, a bent portion 16b acts upon an operating portion 13c of a first hook 13 and makes a first hook 13 rotate around an axis 13a toward a clockwise direction, and thereby releases a hook with a bent portion 11c on a first driving member 11 from a hook portion 13b (See FIG. 4). Depending upon this operation, the first driving member 11 rotates toward a clockwise direction and operates a pin 7b fitting to a slit 11b and thereby rotates a driving ring 7 around an optical axis toward a counter clockwise direction and makes an opening blade 4 operate to open the shutter opening 6.

The first driving member 11 turns toward a clockwise direction, on a final stage of an operation thereof, pushes a bent portion 15c of a subsidiary hook 15 by a left side surface 11e, and releases a hook with a bent portion 12b on a second driving member 12 from a hook portion 15a (See FIG. 5). Further, the first driving member 11 operates a flush synchronizing switch well-known but not shown, on a final stage of a clockwise rotation thereof and makes it operable to carry out a flush exposure. This switch operation for a flush synchronization would be used in a case to fire a flush just after the opening blade 4 would be fully opened.

On the other hand, as a bent portion 12b is hooked already on a hook portion 14b of a second hook 14, the second driving member 12 would keep in a position approximately shown in a figure without a rotation toward a clockwise direction.

In order to control of an exposure time of a shutter, after a predetermined time elapses, an electric current is turned on a magnet M to a reverse direction, and then a plunger P displaces immediately to a place where it was, and thereby operates a pin 16c of an armature lever 16 by a slit Pa thereof. An armature lever 16 rotates around an axis 16a toward clockwise direction and a bent portion 16b contacts with an operating portion 14c, and then makes a second hook 14 rotate around an axis 14a toward a counter clockwise direction. During this operation, a second hook 14 releases a hook with a bent portion 12b on a second driving member 12 from a hook portion 14b (See FIG. 6), and then a second driving member 12 starts to rotate toward a clockwise direction, a pin 12a contacts with an operating portion 10d and thereby makes a third driving member 10 rotate around an axis 10a toward a counter clockwise direction.

Figure 7:
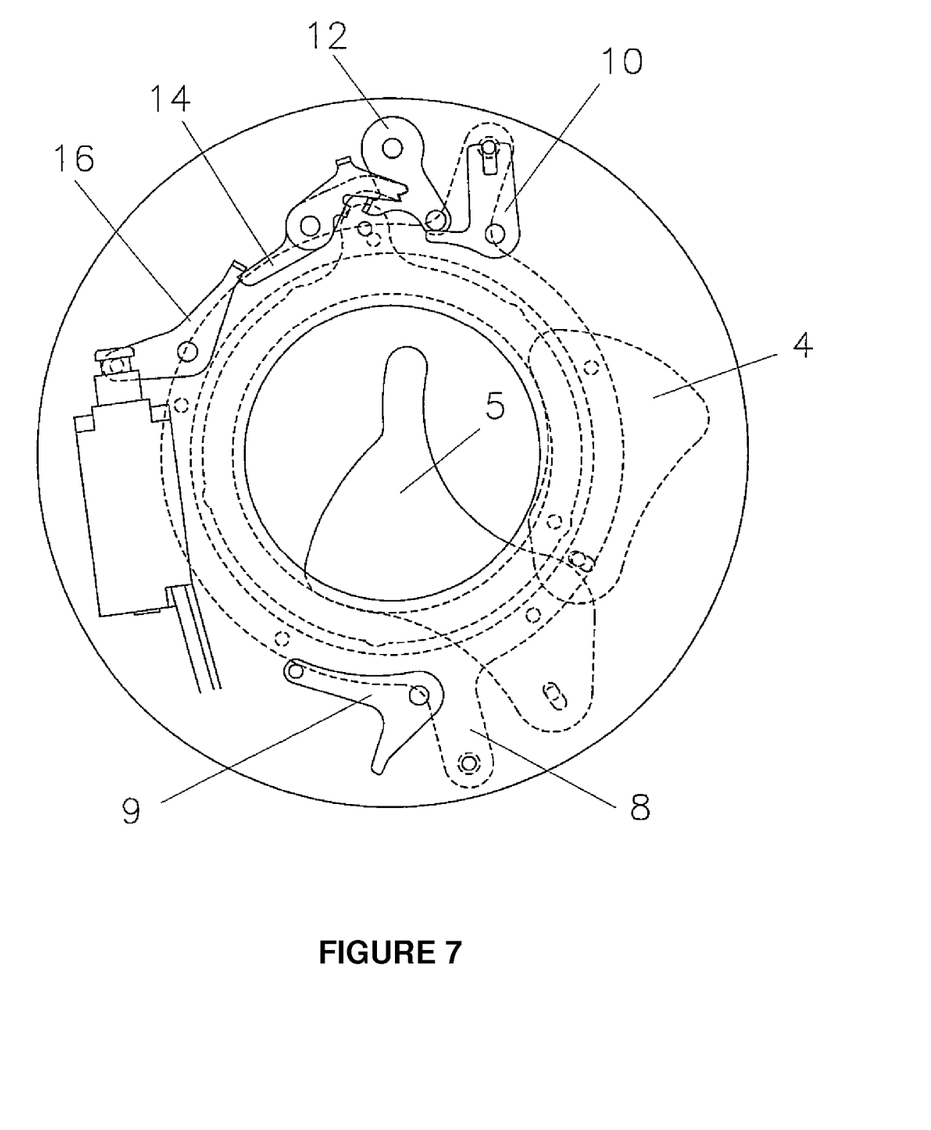
FIG. 7 is a plain view shown an essential part in a finished situation of an exposure operation according to an embodiment of the present invention.
Figure 8:
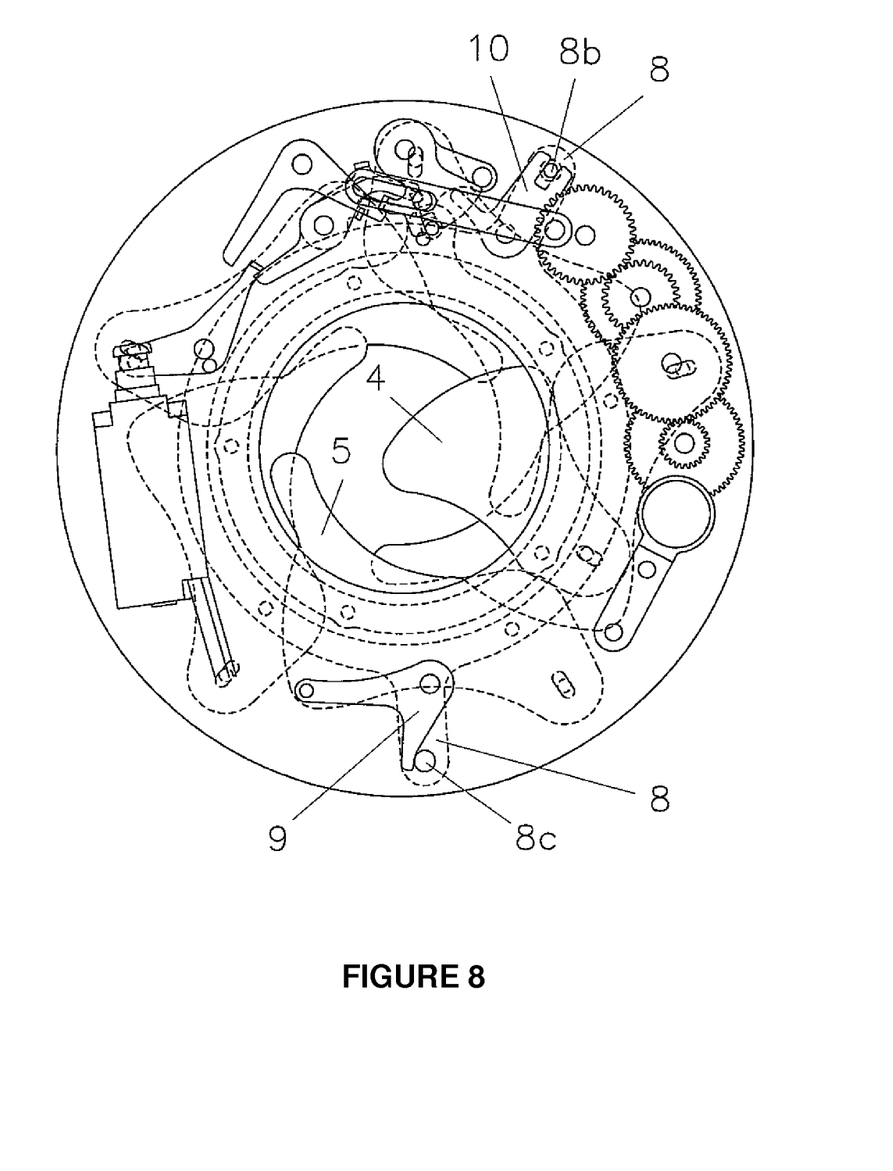
FIG. 8 is a plane view shown an iris shape formed by closing blades according to an embodiment of the present invention.

A third driving member 10 rotates toward a counter clockwise direction, fits a pin 8b in a slit 10b formed on a forked portion 10c and thereby makes a closing ring 8 rotate around an optical axis toward a counter clockwise direction and thereafter ends an exposure operation by closing a closing blade 5 forming a predetermined aperture size. FIG. 7 shows this situation.

In addition, it can carry out a flush light exposure by that it operates a second flush synchronizing switch not shown but well-known at the same time approximately as a third driving member 10 starts to operate. This operation with a flush synchronize switch would be used in a case to fire a flush just before a closing blade 5 starts a closing operation.

Hereupon, depending upon selections cases that said first driving member 11 makes a flush synchronizing switch operate at a final stage of a clockwise rotation or that it operates a second flush synchronizing switch at the same time approximately as a third driving member 10 starts to operate, it can make gain different effects with a flush firing respectively.

By an operation described above, one cycle of shutter operation would be completed. A driving motor D starts an operation based on this complete signal, thereafter a gear Rn makes rotate through a gear train R. And then by a setting plate 17, a charge pin 11f is displaced from a position shown in FIG. 5 to right direction and the first driving member 11, the second driving member 12 and the third driving member 10 are displaced respectively to charged positions shown in FIG. 2.

Further, at the same time as said shutter operation is completed, imaging signals charged in the sensor are transmitted to an image treating circuit based on this complete signal of the operation and preserved as static images.

On the constitutions described above, it is formed pins 4a, 4b on a blade, a pin 4a is fitted in an enlarged slit La on a ring restraining plate L, and a driving pin 4b is fitted in a hole 7a formed on a driving ring 7. And pins 5a, 5b are formed on a closing blade 5, pin 5a is fitted in an enlarged slit Ka on a closing ring restraining plate K and a driving pin 5b is fitted in a hole 8a formed on a closing ring 8.

The constitution like this is different from that of a conventional shutter, it is a new constitution adopted on the present invention, and it is extremely a useful constitution in a respect advancing an endurance in a shutter performance.

In other word, in a conventional shutter blade operated with high speed, there are formed a round hole and an enlarged slit on a shutter blade formed by a thin plate, and constituted such as to operate a shutter blade by fitting a driving pin and a stationary pin into said round hole and said enlarged slit. And therefore, an abrasion occurring on shutter blade through sliding between said round hole and said driving pin, or said enlarged slit and said stationary pin would be extremely hard, and a deterioration of a shutter performance during an endurable operation would increase hardly. Namely, since it is constituted such that a round hole and an enlarged slit on a shutter blade formed with thin materials contact respectively with pins on sectional surfaces of a very thin plate, it means that a frictional heat thereto would participate concentrative in this contact points.

While, on the constitution of the present invention described above, pins 4a, 4b are formed on a shutter blade 4 constituted of thin material plates, pin 4a fits to an enlarged slit La on a ring restraining plate L constituted of extremely thick materials comparative with that of a shutter blade and driving pin 4b fits to round hole 7a formed on a driving ring 7 as the same in case mentioned above. Namely, two pins are formed on opening blade 4 operated with high speed, surfaces sliding therewith are constituted of extremely thick materials and therefore a frictional energy thereof would participate distributable in this contact part occupying extremely wide area comparative with a conventional constitution, and then an appearance of an abrasion would be extremely decreased and also it would be able to advance extremely an endurance in a shutter performance. And further it is also the same constitution in connections between a driving ring 7 and a closing blade 5 so that efficiency thereof can also find extremely as same as in above case.

Hereupon, on the description above, a ring restraining plate L defends interference between a driving ring 7 and an opening blade 4 during an operation, and further a closing ring restraining plate K defends interference between a closing ring 8 and a closing blade 5 during an operation. While, if this function providing an efficiency to defend interference would be able to constitute by a way such that a ring restraining plate L and a closing ring restraining plate K are constituted of such ways that attaché directly on a base plate 2 or a shutter case 1 by a screw or a bayonet and so on, it can omit a ring restraining plate L and a closing ring restraining plate K. And, in said case, enlarged slits La, Ka are constituted on a base plate 2 or a shutter case 1 and so on.

And further there is shown the embodiment formed a round hole on a driving ring side and an elongate slit on a fixed part side, but without a restriction of said embodiment, the present invention can carry into effect such that it forms an elongate slit on a driving ring side and a round hole on a fixed part side.

The effect of the invention is as follows. According to the invention described in claim 1, it can be constituted such that by said magnet controlled in connection with a releasing operation of the shutter, displaces said second hook from rest position to charged position and releases said first driving member in connection with operating said first hook, and thereby starts the exposure operation by making said opening blade operate, and such that after a lapse of predetermined time, by said magnet releases the hooking between said second hook and said second driving member and then said closing member is operated by said second driving member so that an exposure operation terminates in connection with displacing said closing blade to the closing position thereof.

And according to the invention described in claim 2, on account of providing a subsidiary hook being operated almost simultaneously in order said second hook toward a reverse direction thereto, weights loaded to said second hook from said first driving member and said second driving member are shared between said second hook and said subsidiary hook, operations thereof would smooth to be a preferable constitution as a weight on operating said first hook would be reduced.

And further according to the invention described in claim 3, it constitutes such that an armature lever operated by a plunger of a magnet lies between the magnet and a second hook or a first hook and operates, and therefore flexibility in a space on designing works increases comparative with a case operating directly without lying an armature lever, and can design effectively.

And further according to the invention described in claim 4, by adopting such a constitution mentioned above, operations would smooth preferably and besides it is merit such that flexibility in a space on designing works increases and can design effectively.

And as further embodiment to attain the invention, on the opening blade operating with high speed is formed a pin, and a sliding surface therewith is constituted with a restrained member, extremely thick plate material, and therefore frictional heat thereon is gathered on this contact point of extremely wide sectional surface comparative with a conventional constitution, and then a growth of an abrasion thereon is extremely restrained and further an endurance in a shutter performance would be extremely advanced.

As mentioned above, it explained in respect to an embodiment concerning to a realization of a technical idea of the present invention but the present invention should be not restricted to an embodiment mentioned above, it would be realized respectively proper changing an embodiment within area of a technical idea of the present invention.

For example, by a deletion of an armature lever 16 in above embodiment, it can constitute so that the plunger P directly operates an operating portion 14c of a second hook 14 and an operating portion 13c of a first hook 13. In this case, it would be easily understood that an operating direction of a plunger P would be a reverse direction compared with in case mentioned above.

And now, the third driving member 10 is only a reversing member of an operating direction and not an indispensable component of the present invention. In other word, it arranges a driving pin 8b formed on a closing ring 8 to a neighbor of a second driving member 12, and constitutes such that operates it directly by a second driving member 12 and thereby can gain the same effect on said operation.

And further, it can constitute such that after it pulls the plunger into a magnet on turning on electronic current to a magnet, it putts back again on cutting off electronic current thereto, or that it provides a magnet winding two coils on normal and reverse directions and it makes a plunger P operate back and forth on turning on electronic current to a magnet with said two coils in order. And it constitutes such providing a permanent magnet in part of plunger P or magnet M and it may adopt the way to control such that they pull or pull off each other by turning on electronic current to a magnet.

Figure 9:
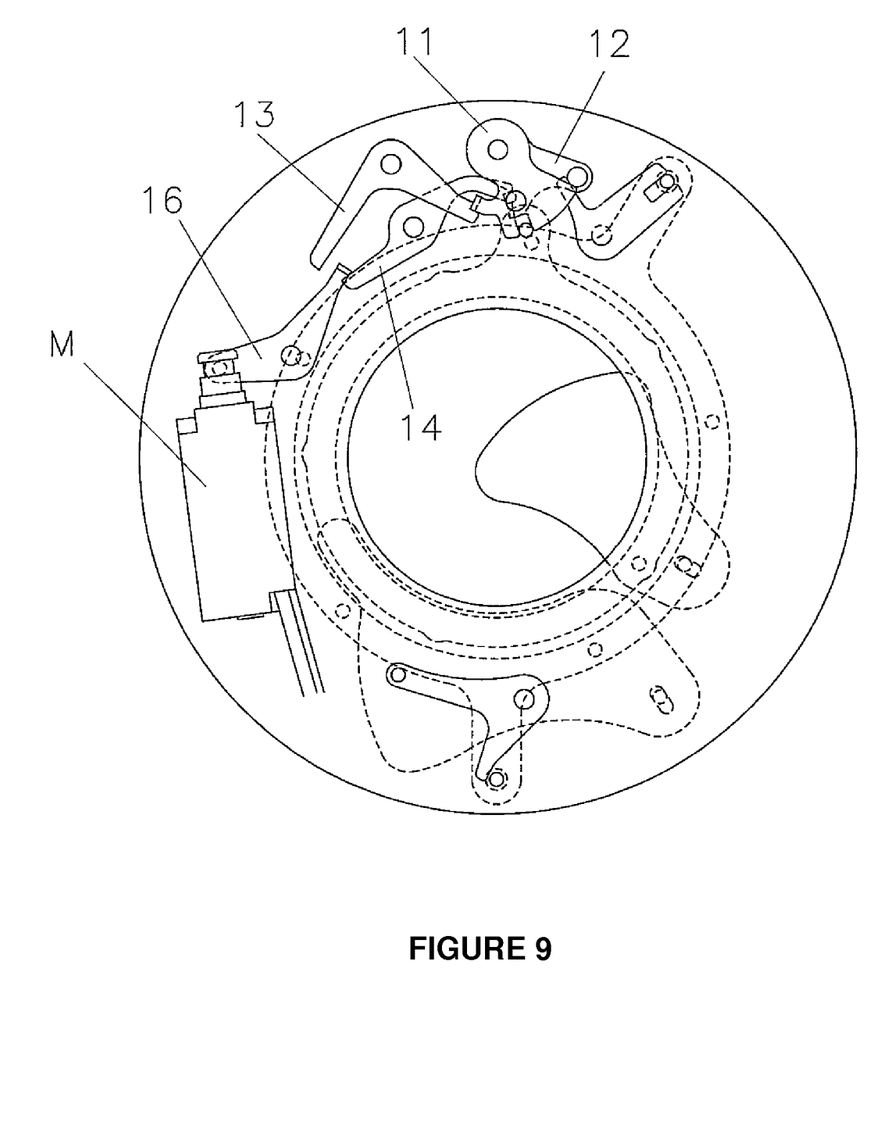
FIG. 9 is a plain view shown whole position in partial change according to another embodiment of the present invention.

And as shown in FIG. 9, by deleting the subsidiary hook 15 in the embodiment described above, it may constitute such that the second hook 14 controls directly to hook and release the second driving member 12. Namely, in the case of deleting the subsidiary hook 15 also, the pin 12a of the second driving member 12 keeps the position shown in FIG. 3 by the right side surface 11d of the first driving member 11, and while the first driving member 11 maintains the arrangement between the second driving member 12 and the second hook 14 by its contact with the second driving member 12 such that the hook portion 14b of the second hook 14 is displaceable to a place to hook the bent portion 12b of the second driving member 12 in accordance with the operation of the armature lever 16, which moves between an operating position to operate the first hook 13 and a rest position to release the second hook 14. Then operations thereafter would be able to carry out as same as in the case described above.

What is claimed is:

1. In a camera shutter for settling a closing blade to a preset value in a predetermined position prior to starting of shutter operation, starting an exposure operation by an opening blade, and further terminating an exposure by displacing a closing blade to a closing position, a camera shutter comprising:
 a first drive member operating said opening blade;
 a first hook holding said first drive member in a charged position;
 a closing member operating said closing blade to a position closing a shutter opening;
 a second drive member displacing said closing blade to position closing a shutter opening by operating said closing member;
 a second hook holding by directly engaging said second drive member in a charged position;
 a magnet controlling operative timings between said first and second hooks by moving between an operating and a rest position;
 wherein by said magnet controlled in connection with a releasing operation of the shutter, displaces said second hook from rest position to charged position while the first drive member maintains an arrangement between the second drive member and the second hook by contacting the second drive member and thereafter releases said first drive member in connection with operating said first hook, and thereby starts the exposure operation by making said opening blade operate, and wherein after a lapse of predetermined time, by said magnet releases the hooking between said second hook and said second driving member and then said closing member is operated by said second driving member so that an exposure operation terminates in connection with displacing said closing blade to the closing position thereof.

2. The camera shutter of claim 1, wherein the magnet is a single magnet.

3. In a camera shutter for settling a closing blade to a preset value in a predetermined position prior to starting of shutter operation, starting an exposure operation by an opening blade, and further terminating an exposure by displacing a closing blade to a closing position, a camera shutter comprising:
- a first drive member operating said opening blade;
- a first hook holding said first drive member in a charged position;
- a closing member operating said closing blade to a position closing a shutter opening;
- a second drive member displacing said closing blade to position closing a shutter opening by operating said closing member;
- a second hook holding said second drive member in a charged position;
- a subsidiary hook being operative to hold said second hook toward a reverse direction thereto;
- a magnet controlling operative timings between said first and second hooks and further said subsidiary hook by moving between an operating and a rest position;
- wherein by said magnet controlled in connection with a releasing operation of the shutter, displaces said second hook from rest position to charged position while the second drive member is held by the subsidiary hook, releases said first drive member in connection with operating said first hook, thereby starts the exposure operation by making said opening blade operate, and further displaced said subsidiary hook to a rest position from a charged position, and thereafter make said second driving member hold to said second hook, and wherein after a lapse of predetermined time, by said magnet releases the hooking between said second hook and said second driving member, and then said closing member is operated by said second driving member so that an exposure operation terminates in connection with displacing said closing blade to the closing position thereof.

4. The camera shutter of claim 3, wherein the magnet is a single magnet.

5. In a camera shutter for settling a closing blade to a preset value in a predetermined position prior to starting of shutter operation, starting an exposure operation by an opening blade, and further terminating an exposure by displacing a closing blade to a closing position, a camera shutter comprising:
- a first drive member operating said opening blade;
- a first hook holding said first drive member in a charged position;
- a closing member operating said closing blade to a position closing a shutter opening;
- a second drive member displacing said closing blade to position closing a shutter opening by operating said closing member;
- a second hook holding by directly engaging said second drive member in a charged position;
- a magnet controlling operative timings between said first and second hooks by moving between an operating and a rest position;
- an armature lever controlled pull or pull-off positions thereof by said magnet;
- wherein by said magnet controlled in connection with a releasing operation of the shutter, operates said armature lever and then displaces said second hook from rest position to charged position while the first drive member maintains an arrangement between the second drive member and the second hook by contacting the second drive member and thereafter releases said first drive member in connection with operating said first hook, and thereby starts the exposure operation by making said opening blade operate, and
- wherein after a lapse of predetermined time, by said magnet operates said armature lever and releases the hooking between said second hook and said second driving member, and then said closing member is operated by said second driving member so that an exposure operation terminates in connection with displacing said closing blade to the closing position thereof.

6. The camera shutter of claim 5, wherein the magnet is a single magnet.

7. In a camera shutter for settling a closing blade to a preset value in a predetermined position prior to starting of shutter operation, starting an exposure operation by an opening blade, and further terminating an exposure by displacing a closing blade to a closing position, a camera shutter comprising:
- a first drive member operating said opening blade;
- a first hook holding said first drive member in a charged position;
- a closing member operating said closing blade to a position closing a shutter opening;
- a second drive member displacing said closing blade to position closing a shutter opening by operating said closing member;
- a second hook holding said second drive member in a charged position;
- a subsidiary hook being operated in order said second hook toward a reverse direction thereto;
- a magnet controlling operative timings between said first and second hooks and further said subsidiary hook by moving between an operating and a rest position;
- an armature lever controlled pull or pull-off positions thereof by said magnet;
- wherein by said magnet controlled in connection with a releasing operation of the shutter, operates said armature lever and then displaces said second hook from rest position to charged position while the second drive member is held by the subsidiary hook, releases said first drive member in connection with operating said first hook, thereby starts the exposure operation by making said opening blade operate, and further displaced said subsidiary hook to a rest position from a charged position, and thereafter make said second driving member hold to said second hook, and
- wherein after a lapse of predetermined time, by said magnet operates said armature lever, and releases the hooking between said second hook and said second driving member, and then said closing member is operated by said second driving member so that an exposure operation terminates in connection with displacing said closing blade to the closing position thereof.

8. The camera shutter of claim 7, wherein the magnet is a single magnet.

* * * * *